United States Patent
Sole et al.

(10) Patent No.: US 8,315,475 B2
(45) Date of Patent: Nov. 20, 2012

(54) METHOD AND APPARATUS FOR DETECTING IMAGE BLOCKING ARTIFACTS

(75) Inventors: Joel Sole, Plainsboro, NJ (US); Peng Yin, Ithaca, NY (US)

(73) Assignee: Thomson Licensing, Boulogne-Billancourt (FR)

( * ) Notice: Subject to any disclaimer, the term of this patent is extended or adjusted under 35 U.S.C. 154(b) by 678 days.

(21) Appl. No.: 12/460,764

(22) Filed: Jul. 24, 2009

(65) Prior Publication Data

US 2010/0027897 A1  Feb. 4, 2010

Related U.S. Application Data

(60) Provisional application No. 61/085,094, filed on Jul. 31, 2008.

(51) Int. Cl.
G06K 9/36 (2006.01)
G06K 9/40 (2006.01)
G06K 9/46 (2006.01)

(52) U.S. Cl. .................................. 382/268; 382/232

(58) Field of Classification Search .................. None
See application file for complete search history.

(56) References Cited

U.S. PATENT DOCUMENTS

| | | | |
|---|---|---|---|
| 6,240,135 B1* | 5/2001 | Kim | 375/240.01 |
| 6,847,738 B1 | 1/2005 | Scognamiglio et al. | |
| 6,912,255 B2 | 6/2005 | Drezner et al. | |
| 7,003,173 B2 | 2/2006 | Deshpande | |
| 7,068,722 B2 | 6/2006 | Wells | |
| 7,170,933 B2 | 1/2007 | Kouloheris et al. | |
| 7,362,810 B2 | 4/2008 | Wang | |
| 2003/0053708 A1* | 3/2003 | Kryukov et al. | 382/261 |
| 2007/0183496 A1* | 8/2007 | Kadono et al. | 375/240.08 |
| 2007/0189735 A1* | 8/2007 | Kawashima et al. | 386/112 |
| 2007/0237241 A1* | 10/2007 | Ha et al. | 375/240.27 |
| 2008/0043852 A1* | 2/2008 | Park et al. | 375/240.27 |
| 2008/0117980 A1* | 5/2008 | Hung et al. | 375/240.24 |
| 2008/0159404 A1* | 7/2008 | Hong et al. | 375/240.23 |

FOREIGN PATENT DOCUMENTS

WO  WO 2007/130389  11/2007

OTHER PUBLICATIONS

Liu et al. "Objective image quality measure for block-based DCT coding", IEEE 1997.*
Wang et al. "Reduced-reference image quality assessment using a wavelet-domain natural image statistic model", Proc. SPIE, vol. 5666, Jan. 2005.*
Kusuma et al. "A reduced-reference perceptual quality metric for in-service image quality assessment", IEEE 2003.*

(Continued)

*Primary Examiner* — Li Liu
(74) *Attorney, Agent, or Firm* — Robert D. Shedd; Paul P. Kiel; Guy H. Eriksen (57) ABSTRACT

A method and apparatus are provided for detecting image blocking artifacts. The apparatus includes a full-reference blocking artifact detector for detecting blocking artifacts in a processed version of a picture based on a blockiness metric. The blockiness metric is determined based on respective local variations in the processed version of the picture and in an original version of the picture.

20 Claims, 7 Drawing Sheets

OTHER PUBLICATIONS

S. Minami et al: "An Optimization Approach for Removing Blocking Effects in Transform Coding"; IEEE Transactions on Circuits and Systems for Video Technology, vol. 5, No. 2, Apr. 1995, pp. 74-82.

Chan et al. "Psychovisually-based image quality evaluator for JPEG images", IEEE 2000.

H.R. Wu et al: "A Generalized Block-Edge Impairment Metric for Video Coding", IEEE Signal Processing Letters, vol. 4, No. 11, Nov. 1997, pp. 317-320.

C. Fenimore et al.: "Mosquito noise in MPEG-compressed video: test patterns and metrics", National Institute of Standards and Technology, Gaithersburg, Maryland USA.

W. Gao et al: "A De-Blocking Algorithm and a Blockiness Metric for Highly Compressed Images", IEEE Transactions on Circuits and Systems for Video Technology, vol. 12, No. 12, Dec. 2002, pp. 1150-1159.

* cited by examiner

METHOD AND APPARATUS FOR DETECTING IMAGE BLOCKING ARTIFACTS

CROSS-REFERENCE TO RELATED APPLICATIONS

This application claims the benefit of U.S. Provisional Application Ser. No. 61/085,094 filed on Jul. 31, 2008, which is incorporated by reference herein in its entirety.

TECHNICAL FIELD

The present principles relate generally to video encoding and, more particularly, to a method and apparatus for detecting image blocking artifacts.

BACKGROUND

The block-based discrete transform is a fundamental component of many image and video compression standards including, for example, the joint photographic experts group (JPEG) Standard, the International Telecommunication Union, Telecommunication Sector (ITU-T) H.263 Recommendation (hereinafter the "H.263 Recommendation"), the International Organization for Standardization/international Electrotechnical Commission (ISO/IEC) Moving Picture Experts Group-1 (MPEG-1) Standard, ISO/IEC MPEG-2 Standard, and the ISO/IEC MPEG-4 Part 10 Advanced Video Coding (AVC) Standard/ITU-T H.264 Recommendation (hereinafter the "MPEG-4 AVC Standard"). Further, the block-based discrete transform is used in a wide range of applications.

The discrete cosine transform (DCT) is the most extensively used block transform. The DCT scheme takes advantage of the local spatial correlation property of the image/frame by dividing the image/frame into blocks of pixels (usually 4×4 and 8×8), transforming each block from the spatial domain to the frequency domain using the discrete cosine transform and quantizing the DCT coefficients. Since blocks of pixels are treated as single entities and coded separately, correlation among spatially adjacent blocks is not taken into account in coding, which results in block boundaries being visible when the decoded image is reconstructed. For example, a smooth change of luminance across a border can result in a step in the decoded frame if neighboring samples fall into different quantization intervals. Such so-called "blocking" artifacts are often very disturbing, especially when the transform coefficients are subject to coarse quantization.

The detection of block artifacts allows for the improvement of video visual quality. Frame regions with blocking artifacts can be targeted to alleviate the problem. This can be done in a video encoder setting, for example, in accordance with the MPEG-4 AVC Standard.

Figure 1:
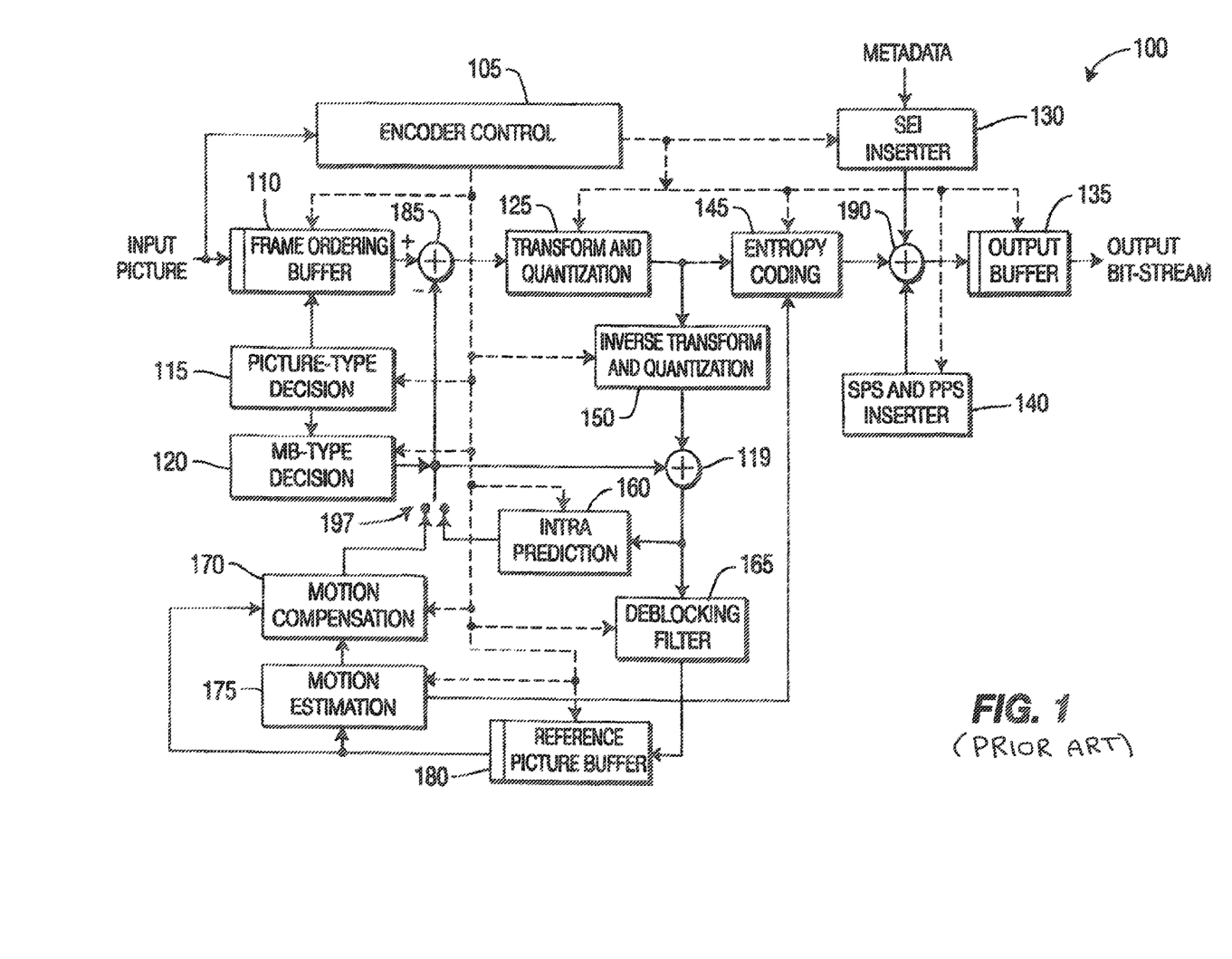
FIG. 1 is a block diagram showing a video encoder capable of performing video encoding in accordance with the MPEG-4 AVC standard.

Turning to FIG. 1, a video encoder capable of performing video encoding in accordance with the MPEG-4 AVC standard is indicated generally by the reference numeral 100.

The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, a first input of a macroblock-type (MB-type) decision module 120, a second input of an intra prediction module 160, a second input of a deblocking filter 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

An output of the SEI inserter 130 is connected in signal communication with a second non-inverting input of the combiner 190.

A first output of the picture-type decision module 115 is connected in signal communication with a third input of a frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module 160 and a first input of the deblocking filter 165. An output of the deblocking filter 165 is connected in signal communication with a first input of a reference picture buffer 180. An output of the reference picture buffer 180 is connected in signal communication with a second input of the motion estimator 175 and a third input of the motion compensator 170. A first output of the motion estimator 175 is connected in signal communication with a second input of the motion compensator 170. A second output of the motion estimator 175 is connected in signal communication with a third input of the entropy coder 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module 160. The output of the switch 197 is connected in signal communication with a second non-inverting input of the combiner 119 and an inverting input of the combiner 185.

A first input of the frame ordering buffer 110 and an input of the encoder controller 105 are available as input of the encoder 100, for receiving an input picture. Moreover, a second input of the Supplemental Enhancement Information (SEI) inserter 130 is available as an input of the encoder 100, for receiving metadata. An output of the output buffer 135 is available as an output of the encoder 100, for outputting a bitstream.

In an environment such as that corresponding to FIG. 1, the blocks having blocking artifacts can be filtered with a deblocking filter, or re-encoded with different coding parameters, or coefficients can be quantized with finer quantization steps, and so forth.

Objective quality assessment is directed to automatically predicting perceived image or video quality without the use of a human observer. Objective quality assessment methods can be classified into three broad categories, namely reduced-reference methods, no-reference methods, and full-reference methods.

Reduced-reference methods have access to partial information regarding the "perfect version" or "original version". The partial information can be made available to the quality assessment algorithm through a side-channel (named as an RR channel).

No-reference methods have access to only the distorted signal and must estimate the quality of the signal without any knowledge of the "original version".

Full-reference methods have access to an "original version" of the image or video against which a respective full-reference method can compare a "distorted version".

Blocking artifact detection (BAD) is computed through a blocking artifact metric, which is an objective quality assessment. The surveyed BAD algorithms are mostly of the type no-reference methods.

Figure 2:
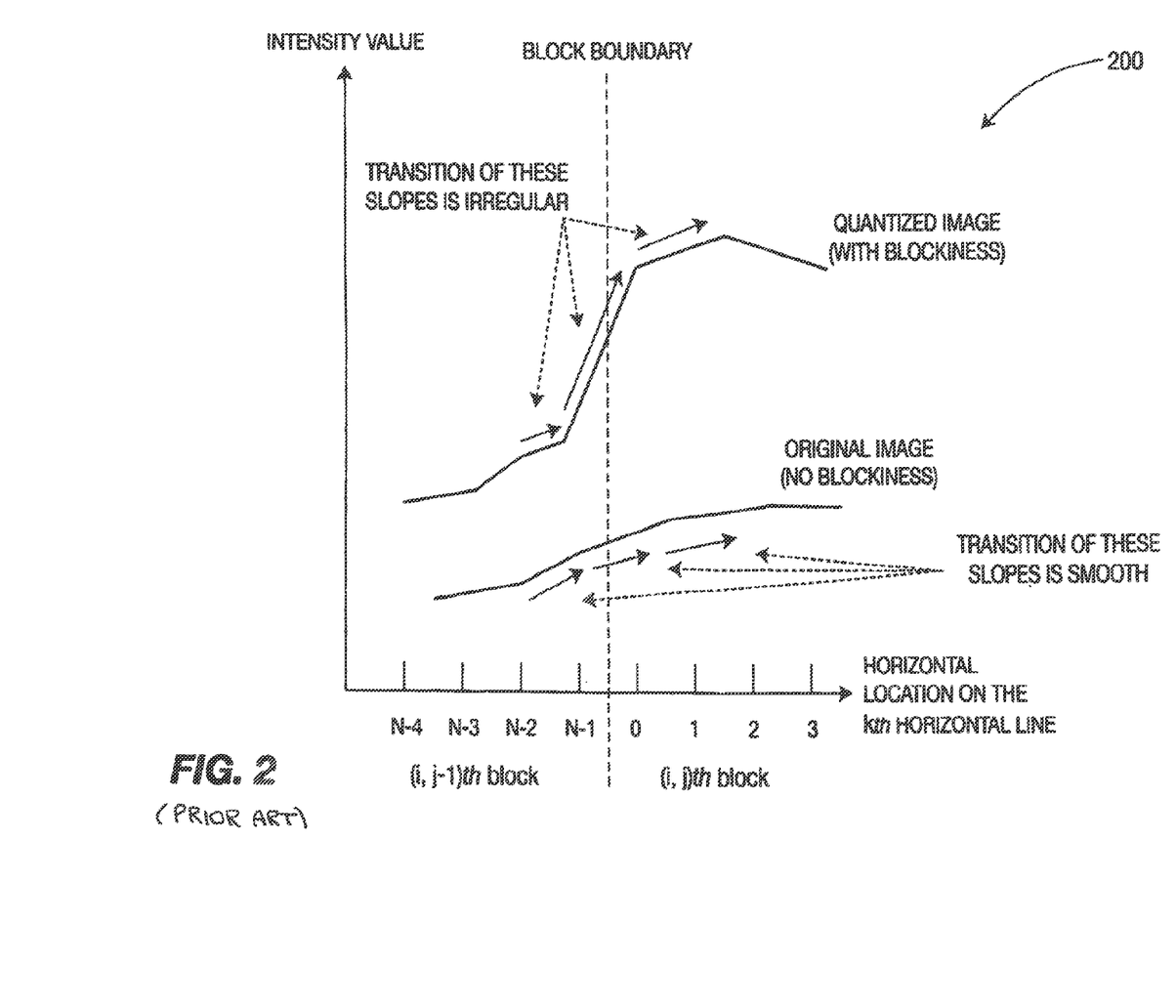
FIG. 2 is a plot showing an exemplary one-dimensional visualization of block boundary obtained using the mean square difference of slope method of blocking artifact detection.

[1] MSDS (Mean square difference of slope): In short, MSDS measures the slope between the pixel values in neighboring blocks. Turning to FIG. 2, an exemplary one-dimensional visualization of block boundary obtained using the mean square difference of slope method of blocking artifact detection is indicated generally by the reference numeral 200. The one-dimensional visualization 200 is shown on a graph with the vertical axis thereof corresponding to intensity value and the horizontal axis thereof corresponding to the horizontal location of a particular macroblock on the $k^{th}$ horizontal line in an input image. With respect to the one-dimensional visualization 200, let N−2, N−1, 0, 1, be the pixel locations between 2 adjacent blocks. Let s1 be defined as the slope between the $0^{th}$ and $(N-1)^{th}$ pixel and let s2 be the sum of the slopes between (N−1) and (N−2) and 0 and 1. Then, the MSDS for one direction is defined as (s1−s2)/2. The overall MSDS is found by summing individual MSDS over all 4 neighbors.

[2] PIQE-B (Psychovisual image quality evaluator, a DC coefficient of DCT-based metric): Blockiness index (B) is found as follows:

Take the difference of the DC coefficient of the center macroblock with its 8-neighbors.

Sum the difference over 8-neighbors. Let this sum be s_p.

Do the same with the original frame and obtain the sum as s_or.

The blockiness index is the sum of the absolute difference of s_p-s_or over all the blocks in the image.

[3] GBIM (Generalized Block-edge impairment metric): This metric also uses the differences between the pixel values at the block boundaries. However some type of human visual principles (HVS) principles is also included in the metric. The pixel differences are weighted by a weighting matrix whose values depend on spatial characteristics of the image. In general, more weights are given to those boundaries which are more visible. The luminance masking effect is used in determining weights. The noise in extreme bright areas as well as extreme dark areas is less visible compared to luminance values between 70 and 90 (in an 8 bit gray scale image).

[4] FLATS: This metric works on the luminance values of an image. Each 8×8 block is classified based on the homogeneity of the pixel values. If luminance is constant in the entire block, i.e., if luminance is constant in the horizontal direction and is also constant in the vertical direction, then these blocks are chosen for further consideration. Then, the average luminance of North, South, East, and West blocks are compared to the average luminance value of the center block. If the minimum of the difference of (N, E, S, or W) divided by the average luminance of the pixels within a 24×24 block is greater than a given threshold, then the block is considered flat.

These and other blocking artifact detection (BAD) methods can be found in the prior art, but they are of the previously described "no-reference" type.

SUMMARY

These and other drawbacks and disadvantages of the prior art are addressed by the present principles, which are directed to a method and apparatus for detecting image blocking artifacts.

According to an aspect of the present principles, there is provided an apparatus. The apparatus includes a full-reference blocking artifact detector for detecting blocking artifacts in a processed version of a picture based on a blockiness metric. The blockiness metric is determined based on respective local variations in the processed version of the picture and in an original version of the picture.

According to another aspect of the present principles, there is provided a method. The method includes detecting blocking artifacts in a processed version of a picture based on a blockiness metric. The blockiness metric is determined based on respective local variations in the processed version of the picture and in an original version of the picture.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to a method and apparatus for detecting image blocking artifacts.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As noted above, the detection of block artifacts allows the improvement of video visual quality. Frame regions with blocking artifacts can be targeted to alleviate the problem. The blocks having blocking artifacts can be filtered with a deblocking filter, or re-encoded with different coding parameters, or coefficients can be quantized with finer quantization steps, and so forth. Whichever is done, the artifacts must first be detected prior to the application of these processing techniques, and thus, a blocking artifact detector is needed.

Figure 3:
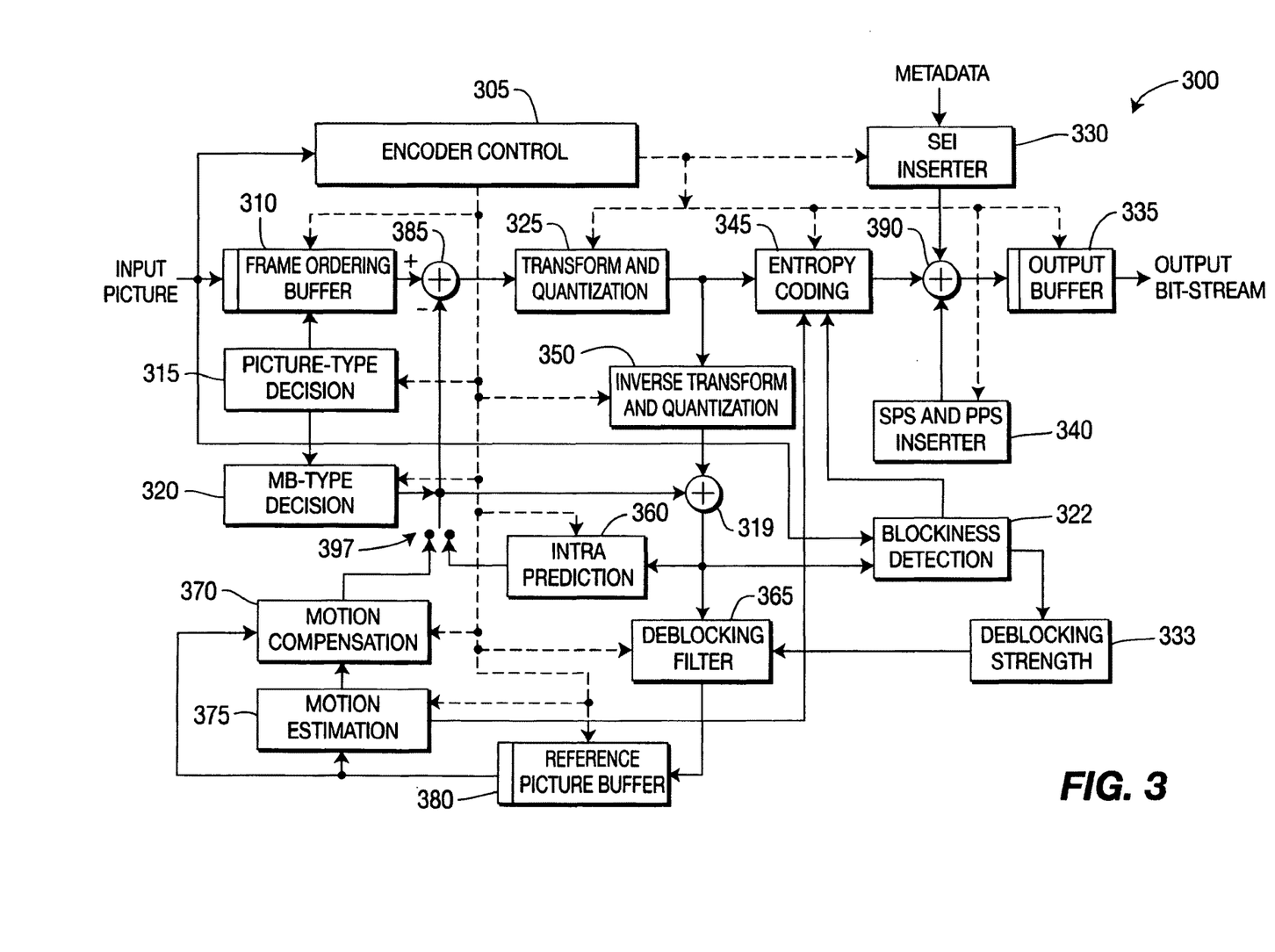
FIG. 3 is a block diagram showing an exemplary encoder having an image blocking artifacts detector, in accordance with an embodiment of the present principles.

Turning to FIG. 3, an exemplary encoder having an image blocking artifacts detector is indicated generally by the reference numeral 300.

The video encoder 300 includes a frame ordering buffer 310 having an output in signal communication with a non-inverting input of a combiner 385. An output of the combiner 385 is connected in signal communication with a first input of a transformer and quantizer 325. An output of the transformer and quantizer 325 is connected in signal communication with a first input of an entropy coder 145 and a first input of an inverse transformer and inverse quantizer 350. An output of the entropy coder 345 is connected in signal communication with a first non-inverting input of a combiner 390. An output of the combiner 390 is connected in signal communication with a first input of an output buffer 335.

A first output of an encoder controller 305 is connected in signal communication with a second input of the frame ordering buffer 310, a second input of the inverse transformer and inverse quantizer 350, an input of a picture-type decision module 315, a first input of a macroblock-type (MB-type) decision module 320, a second input of an intra prediction module 360, a second input of a deblocking filter 365, a first input of a motion compensator 370, a first input of a motion estimator 375, and a second input of a reference picture buffer 380.

A second output of the encoder controller 305 is connected in signal communication with a first input of a Supplemental Enhancement Information (SEI) inserter 330, a second input of the transformer and quantizer 325, a second input of the entropy coder 345, a second input of the output buffer 335, and an input of the Sequence Parameter Set (SPS) and Picture Parameter Set (PPS) inserter 340.

An output of the SEI inserter 330 is connected in signal communication with a second non-inverting input of the combiner 390.

A first output of the picture-type decision module 315 is connected in signal communication with a third input of a frame ordering buffer 310. A second output of the picture-type decision module 315 is connected in signal communication with a second input of a macroblock-type decision module 320.

An output of the Sequence Parameter Set (SPS) and Picture Parameter Set (PPS) inserter 340 is connected in signal communication with a third non-inverting input of the combiner 390.

An output of the inverse quantizer and inverse transformer 350 is connected in signal communication with a first non-inverting input of a combiner 319. An output of the combiner 319 is connected in signal communication with a first input of the intra prediction module 360, a first input of the deblocking filter 365, and a second input of a blockiness detector 322. An output of the deblocking filter 365 is connected in signal communication with a first input of a reference picture buffer 380. An output of the reference picture buffer 380 is connected in signal communication with a second input of the motion estimator 375 and a third input of the motion compensator 370. A first output of the motion estimator 375 is connected in signal communication with a second input of the motion compensator 370. A second output of the motion estimator 375 is connected in signal communication with a third input of the entropy coder 345.

A first output of the blockiness detector 322 is connected in signal communication with a fourth input of the entropy coder 345. A second output of the blockiness detector 322 is connected in signal communication with an input of a deblocking strength determination device 333. An output of the deblocking strength determination device 333 is connected in signal communication with a third input of the deblocking filter 365.

An output of the motion compensator 370 is connected in signal communication with a first input of a switch 397. An output of the intra prediction module 360 is connected in signal communication with a second input of the switch 397. An output of the macroblock-type decision module 320 is connected in signal communication with a third input of the switch 397. The third input of the switch 197 determines whether or not the "data" input of the switch (as compared to the control input, i.e., the third input) is to be provided by the motion compensator 370 or the intra prediction module 360. The output of the switch 397 is connected in signal communication with a second non-inverting input of the combiner 319 and an inverting input of the combiner 385.

A first input of the frame ordering buffer 310, an input of the encoder controller 305, and a first input of the blockiness detector 322 are available as inputs of the encoder 300, for receiving an input picture. Moreover, a second input of the Supplemental Enhancement Information (SEI) inserter 330 is available as an input of the encoder 300, for receiving metadata. An output of the output buffer 335 is available as an output of the encoder 300, for outputting a bitstream.

It is to be appreciated that the encoder 300 with blockiness detection allows more filtering for those blocks having more blocking artifacts.

Figure 4:
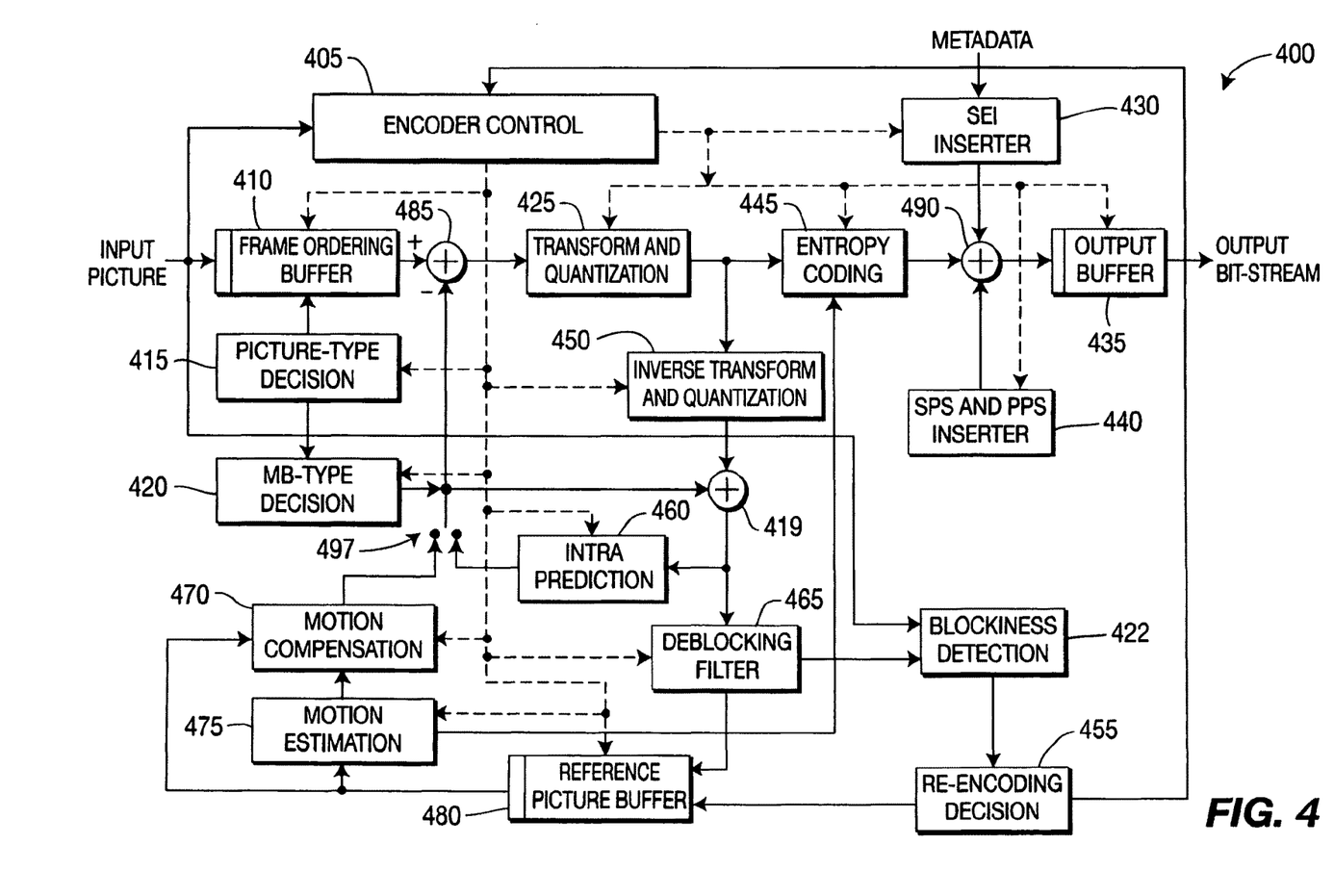
FIG. 4 is a block diagram showing another exemplary encoder having an image blocking artifacts detector, in accordance with an embodiment of the present principles.

Turning to FIG. 4, another exemplary encoder having an image blocking artifacts detector is indicated generally by the reference numeral 400.

The video encoder 400 includes a frame ordering buffer 410 having an output in signal communication with a non-inverting input of a combiner 485. An output of the combiner 485 is connected in signal communication with a first input of a transformer and quantizer 425. An output of the transformer and quantizer 425 is connected in signal communication with a first input of an entropy coder 445 and a first input of an inverse transformer and inverse quantizer 450. An output of the entropy coder 445 is connected in signal communication with a first non-inverting input of a combiner 490. An output of the combiner 490 is connected in signal communication with a first input of an output buffer 435.

A first output of an encoder controller 405 is connected in signal communication with a second input of the frame ordering buffer 410, a second input of the inverse transformer and inverse quantizer 450, an input of a picture-type decision module 415, a first input of a macroblock-type (MB-type) decision module 420, a second input of an intra prediction module 460, a second input of a deblocking filter 465, a first input of a motion compensator 470, a first input of a motion estimator 475, and a second input of a reference picture buffer 480.

A second output of the encoder controller 405 is connected in signal communication with a first input of a Supplemental Enhancement Information (SEI) inserter 430, a second input of the transformer and quantizer 425, a second input of the entropy coder 445, a second input of the output buffer 435, and an input of the Sequence Parameter Set (SPS) and Picture Parameter Set (PPS) inserter 440.

An output of the SEI inserter 430 is connected in signal communication with a second non-inverting input of the combiner 490.

A first output of the picture-type decision module 415 is connected in signal communication with a third input of a frame ordering buffer 410. A second output of the picture-type decision module 415 is connected in signal communication with a second input of a macroblock-type decision module 420.

An output of the Sequence Parameter Set (SPS) and Picture Parameter Set (PPS) inserter 440 is connected in signal communication with a third non-inverting input of the combiner 490.

An output of the inverse quantizer and inverse transformer 450 is connected in signal communication with a first non-inverting input of a combiner 419. An output of the combiner 419 is connected in signal communication with a first input of the intra prediction module 460 and a first input of the deblocking filter 465. A first output of the deblocking filter 465 is connected in signal communication with a first input of a reference picture buffer 180. An output of the reference picture buffer 480 is connected in signal communication with a second input of the motion estimator 475 and a third input of the motion compensator 470. A first output of the motion estimator 475 is connected in signal communication with a second input of the motion compensator 470. A second output of the motion estimator 475 is connected in signal communication with a third input of the entropy coder 445.

An output of the motion compensator 470 is connected in signal communication with a first input of a switch 497. An output of the intra prediction module 460 is connected in signal communication with a second input of the switch 497.

An output of the macroblock-type decision module 420 is connected in signal communication with a third input of the switch 497. The third input of the switch 497 determines whether or not the "data" input of the switch (as compared to the control input, i.e., the third input) is to be provided by the motion compensator 470 or the intra prediction module 460. The output of the switch 497 is connected in signal communication with a second non-inverting input of the combiner 419 and an inverting input of the combiner 485.

A second output of the deblocking filter 465 is connected in signal communication with a second input of a blockiness detector 422. An output of the blockiness detector 422 is connected in signal connection with an input of a re-encoding decision device 455. A first output of the re-encoding decision device 455 is connected in signal communication with a second input of the encoder controller 405. A second output of the re-encoding decision device 455 is connected in signal communication with a third input of the reference picture buffer 480.

A first input of the frame ordering buffer 410, a first input of the encoder controller 405, and a first input of the blockiness detector 422 are available as inputs of the encoder 400, for receiving an input picture. Moreover, a second input of the Supplemental Enhancement Information (SEI) inserter 430 is available as an input of the encoder 400, for receiving metadata. An output of the output buffer 435 is available as an output of the encoder 400, for outputting a bitstream.

It is to be appreciated that the encoder 400 with blockiness detection allows for a check to be performed regarding whether or not to re-encode with different parameters, finer quantization steps, and so forth, if blocking artifacts are detected. In an embodiment, the check may involve comparing an amount of blockiness detected to a threshold, and implementing the re-encoding when the detected amount of blockiness exceeds the threshold.

Figure 5:
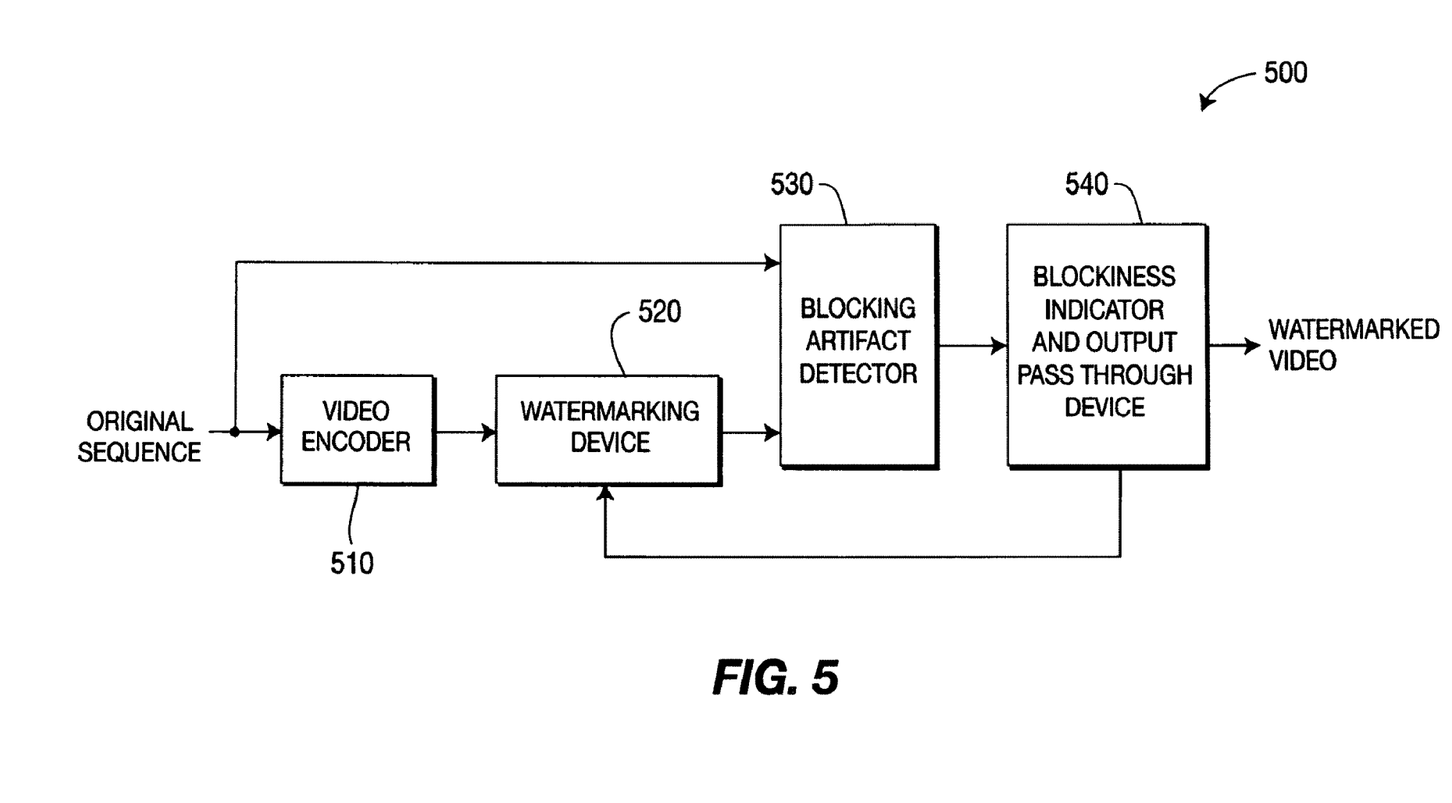
FIG. 5 is a block diagram showing an exemplary watermarking apparatus, in accordance with an embodiment of the present principles.

Another important application of the detector is in the post-processing of the encoded content. Post-processing may modify coefficients directly in the transformed domain. Watermarking techniques may modify the transformed coefficients with the goal of embedding information in these coefficients, mostly for security purposes. However, post-processing/embedding introduces distortion and artifacts (including blocking artifacts). This post-processing should not significantly damage video quality or, ideally, be noticeable at all. The embedding process can bee improved when it is driven by an artifact metric that determines the degree of modification that the coefficients can bear without losing quality or being visually noticeable. Turning to FIG. 5, an exemplary watermarking apparatus is indicated generally by the reference numeral 500. The apparatus 500 includes a video encoder 510 having an output connected in signal communication with a first input of a watermarking device 520. An output of the watermarking device 520 is connected in signal communication with a second input of a blocking artifact detector 530. An output of the blocking artifact detector 530 is connected in signal communication with a blockiness indicator and output pass through device 540. A second output of the blockiness indicator and output pass through device 540 is connected in signal communication with a second input of the watermarking device 520. An input of the video encoder 510 and a first input of the blocking artifact detector 520 are available as inputs to the watermarking apparatus 500, for receiving an original video sequence. A first output of the blockiness indicator and output pass through device 540 is available as an output of the watermarking device 500, for outputting a watermarked video sequence.

It is to be appreciated that the second output of the blockiness indicator and output pass through device 540 is used to indicate to (the second input of) the watermarking device 520 that blockiness exists. If blockiness does not exist, then the blockiness indicator and output pass through device 540 outputs the watermarked video sequence.

The above described and other blocking artifact detection (BAD) methods can be found in the prior art, but they are of the previously described "no-reference" type. The present principles are directed to a method in a "full-reference" type environment because, in general, full-reference methods perform much better than their no-reference counterparts since much more information is available.

Thus, in accordance with the present principles, we describe an apparatus and method to detect the presence of blocking artifacts in image and/or video content. The method is of the full-reference type, that is, it employs a reference frame (possibly the original one) in order to determine the presence of blocking artifacts in the processed frame (which is the frame that has been encoded, watermarked, modified, transmitted, and/or so forth). In an embodiment, a blocking metric is computed for blocks within the frame, and it is determined via this metric whether or not a particular block has artifacts. The metric is computed by comparing the gradient at the block borders in the original and processed frames to the variation in the gradient within the block. Additionally, some thresholds, operators and normalizations may be used in accordance with the method in order to make the method robust to other kind of artifacts.

Figure 6A:
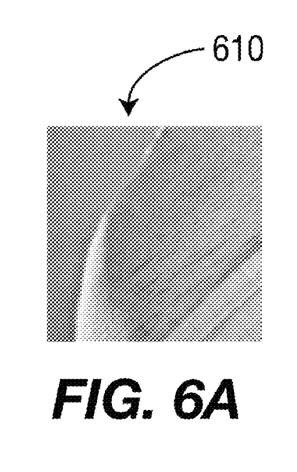
FIG. 6A is a diagram showing an original standard test image, for which a blockiness metric is calculated with respect to different types of distortions/artifacts, in accordance with an embodiment of the present principles.
Figure 6B:
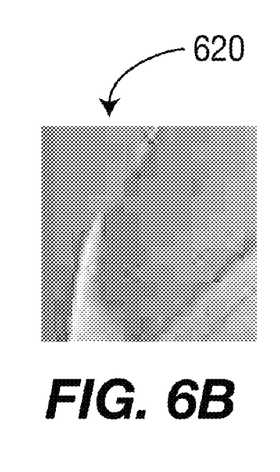
FIGS. 6B-6H are diagrams showing respective examples of a blockiness metric for the original standard test image 610 shown in FIG. 6A, in accordance with an embodiment of the present principles.
Figure 6C:
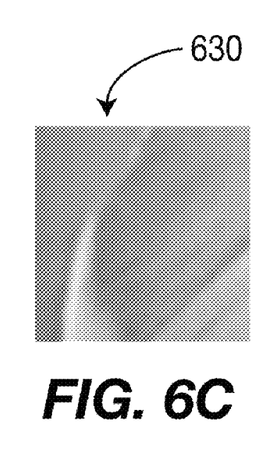
Figure 6D:
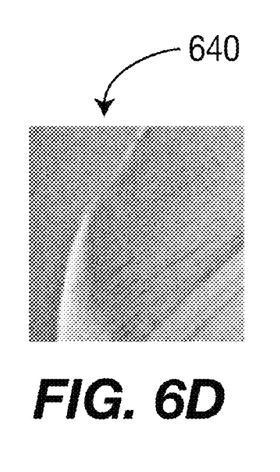
Figure 6E:
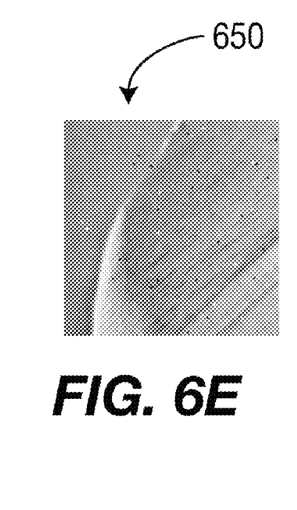
Figure 6F:
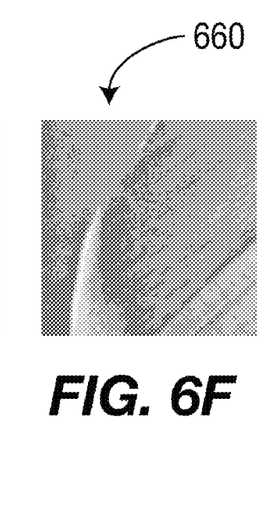
Figure 6G:
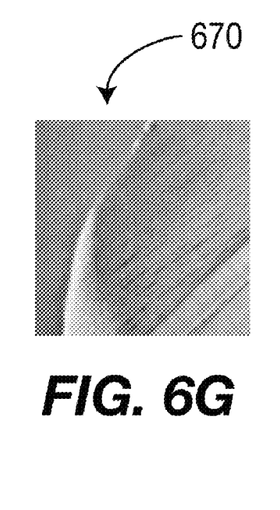
Figure 6H:
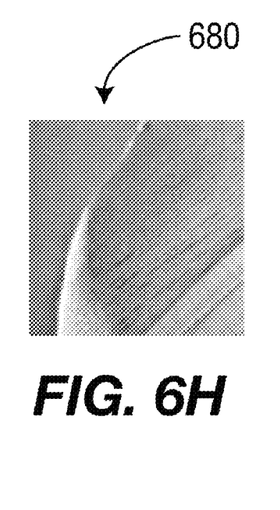

In an embodiment, we describe a full-reference blocking artifact detector. The detector detects block artifacts and is also able to tell them apart from other artifacts found in coding, processing, and/or the transmission of image or video data. Turning to FIG. 6A, an original standard test image, for which a blockiness metric is calculated with respect to different types of distortions/artifacts, is indicated generally by the reference numeral 610. Turning to FIGS. 6B-6H, examples of various versions of the original standard test image 610 shown in FIG. 6A exhibiting various distortions/artifacts are respectively indicated by the reference numerals 620, 630, 640, 650, 660, 670, and 680. Each of the example versions may be considered to be processed (i.e., non-original) versions of the standard test image 610 of FIG. 6A. In particular, the version 620 relates to distortion/artifacts resulting from a conversion of the original standard test image to a JPEG image. The version 630 relates to blurring distortion/artifacts. The version 640 relates to additive white Gaussian noise (AWGN) distortion/artifacts. The version 650 relates to salt and pepper noise distortion/artifacts. The version 660 relates to distortion/artifacts resulting from lowering bit depth. The version 670 relates to distortion/artifacts resulting from gray shifting. The version 680 relates to distortion/artifacts resulting from contrast enhancement (and histogram equalization in general). The value of the blockiness metric for version 620 is 3.820. The value of the blockiness metric for version 630 is 0.038. The value of the blockiness metric for version 640 is 0.047. The value of the blockiness metric for version 650 is 0.045. The value of the blockiness metric for version 660 is 0.707. The value of the blockiness metric for version 670 is 0.0. The value of the blockiness metric for version 680 is 0.067.

The examples shown with respect to FIGS. 6B-6H illustrate how the proposed metric perfectly distinguishes blockiness (most evident in the JPEG encoded image shown in FIG. 6B) from other typical artifacts. In an embodiment, the metric value for the very blocky JPEG image (see, e.g., FIG. 6B) is orders of magnitude larger than the value of the images contaminated with other artifacts, which means that we can distinguish blockiness very easily and with great accuracy. All the artifacts shown in FIGS. 6B-6H damage visual quality, and it is important to be able to distinguish the artifacts from one another since the method used to remove/reduce the artifacts depends on what type of artifact is detected.

In an embodiment, operations are performed in the spatial domain. Basically, this embodiment considers the gradient at the block borders in the original and processed frames relative to the variation in gradient within the blocks. Each block is processed and has its own blockiness measure attached, so each block can be modified accordingly.

Analysis of the Gradient at Block Borders

The gradient is computed for each pixel in the border of the block, for every block in the reference and processed frames. The gradient is computed across the border, so it takes into account pixels in the current and the neighboring blocks. One embodiment of the gradient computation is filtering with the filter h=[1 −1]. Another possible embodiment of the gradient filter is h=[1 2 −2 −1].

The gradient for each block border pixel in the processed frame is compared to the gradient of the block border pixel in the same position in the reference frame. A value for that pixel position is the outcome of this comparison. The resultant value can be seen as a blockiness metric applied to that particular pixel. An embodiment of this comparison is as follows:

if (abs(GradientProcessed)>abs(GradientReference))
and (abs(GradientProcessed)−abs(GradientReference)<Thresh1);

then,
BorderPixelBlockinessMetric=GradientProcessed−GradientReference;

otherwise BorderPixelBlockinessMetric=0 where abs( ) indicates the absolute value operation. Therefore, the metric considers the difference in gradients only if the processed frame has a larger gradient. A consistently larger gradient in the processed frame at the block border is a block artifact with a high probability. However, if the difference in gradients is too high, then it is likely that the artifact is not a blocking artifact, but some other type of distortion/artifact such as, for example, salt and pepper noise distortion/artifact. This is the reason to set a threshold Thresh1 for the difference of gradients. The threshold Thresh1 is set to 64 in an embodiment. However, there are applications in which this kind of salt and pepper noise distortion/artifact is unlikely, and then this comparison with Thresh1 may be safely removed, or altered in value to detect some other type of distortion/artifact.

Border blockiness extraction, normalization, and worst case detection will now be described. A block suffers blocking artifact if at least one of the borders is blocky (i.e., has an artificial step). Therefore, only the worst case of the four borders has to be checked. In an embodiment, the border blockiness is computed by the aggregation of the blockiness of every pixel (or a certain number or percentage of pixels above a given minimum threshold number or percentage of pixels) constituting the border. In an embodiment, we sum the blockiness metric for each pixel (BorderPixelBlockinessMetric) along the border, and normalize the addition by the number of pixels in the border, so we have a border blockiness value (BorderBlockinessMetric) independent of the block size as follows:

$$BorderBlockinessMetric = \frac{\sum_{pixels\ border} BorderPixelBlockinessMetric}{num\_of\_border\_pixels}$$

At this stage, we have the blockiness metric for each of the four borders. Then, the worst case is determined. In an embodiment, the most probable border artifact is the maximum of the absolute values of the four BorderBlockinessMetrics as follows:

BlockBorderBlockinessMetric=max$_{I=1:4}$BorderBlockinessMetric,

Analysis of the Gradient/Variation in the Block

The average gradient or variation within a block for each block within the reference and process frame is computed. The gradient value is normalized by the number of pixels in the block, so the value is independent of the block size and it can be compared to the normalized value of the block border blockiness. In a possible embodiment, InBlockGradient gradient is computed as the sum of all gradients (or a certain number or percentage of gradients above a given minimum threshold number or percentage of gradients) the pixel in the horizontal and vertical direction with the filter h=[1 −1]. More complex filters may be considered in another possible embodiment, like h=[1 2 −2 −1] or any other of the many filters of this kind known to those of ordinary skill in this and related arts. That is, it is to be appreciated that the present principles are not limited to any particular type of filter and, thus, any type of filter may be used in accordance with the teachings of the present principles, while maintaining the spirit of the present principles. In another embodiment, the gradient in diagonal directions may be computed in addition to the horizontal and vertical gradient computation.

The gradient in each block in the processed frame is compared to the gradient in the block in the same position in the reference frame. A value for that block position is the outcome of this comparison. It can be seen as a gradient metric applied to that particular block. In an embodiment, the comparison is as follows:

InBlockGradientMetric=max(abs(ReferenceInBlockGradient),abs(ProcessedInBlockGradient))

Blockiness Computation

At this point, the method gives two different metrics. One of the metrics relates to the gradient or variation along block borders for the processed frame and reference frame. The other metric relates to the aggregated gradient or total variation within a block of the processed frame and reference frame. In an embodiment, the third step of the method combines both metrics in a final blockiness metric that highlights the presence of blocking artifacts in each block. Such a combination can be done in different ways. The preferred embodiment to determine the BlockinessMetric for a block is as follows:

BlockinessMetric=max(0,BlockBorderBlockinessMetric−InBlockGradientMetric)

Blocking Artifact Detection

The result of the method so far is the blockiness metric per block. If a binary output is desired, then the output has to be thresholded. If the metric is above the threshold, then the artifact detection is positive the block. Otherwise, the block is considered to be free of artifacts.

Also, note that there exists the possibility to compute the blockiness for the whole frame. One way to do this is by computing the blockiness average for all the blocks in the frame. Also, a threshold may be applied to this overall value in order to determine the artifact presence in the frame.

Figure 7:
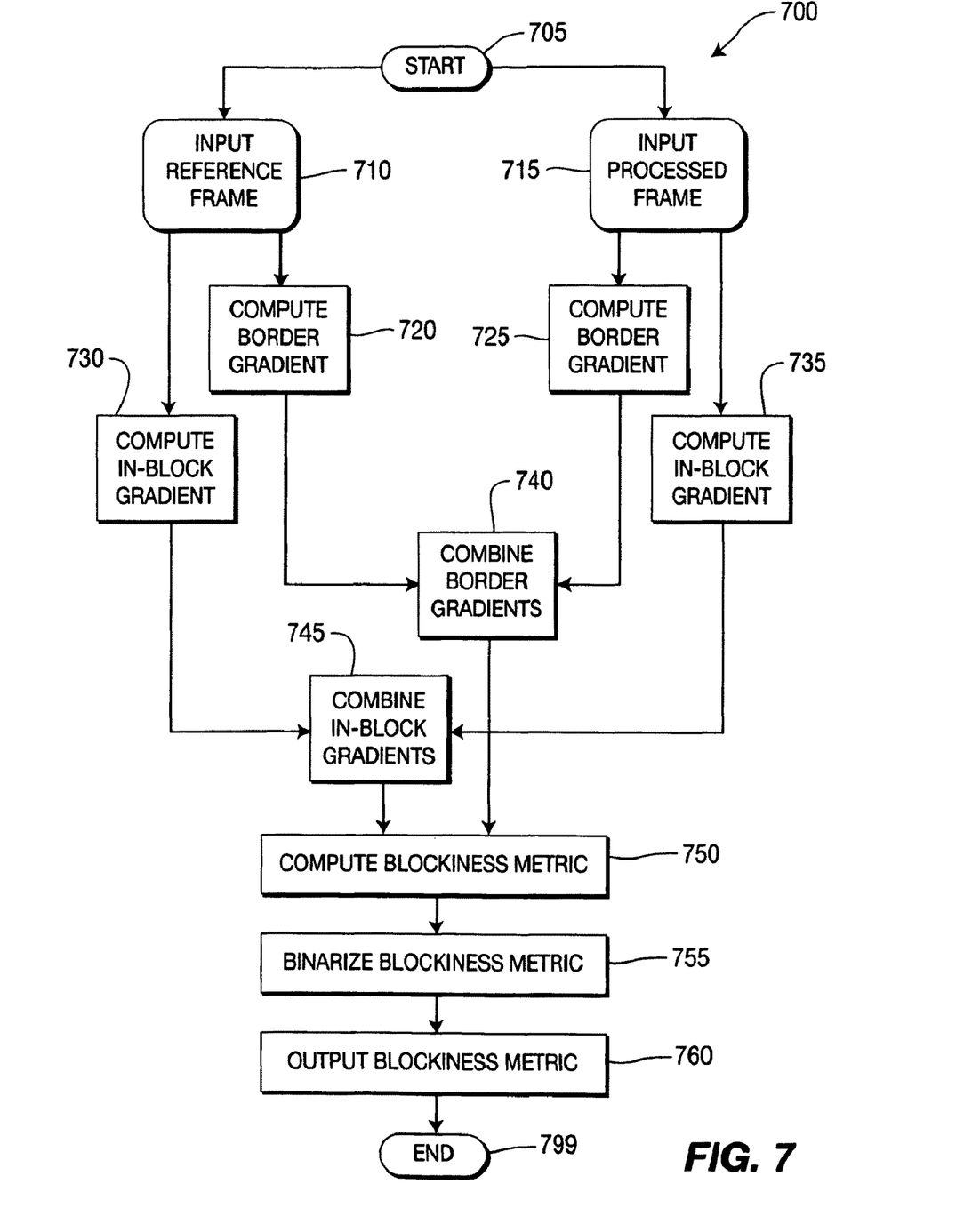
FIG. 7 is a flow diagram for an exemplary method for blocking artifact detection, in accordance with an embodiment of the present principles.

Turning to FIG. 7, an exemplary method for blocking artifact detection is indicated generally by the reference numeral 700. The method 700 includes a start block 705 that passes control to a function block 710 and a function block 715. The function block 710 inputs a reference frame, and passes control to a function block 730 and a function block 720. The function block 715 inputs a processed frame, and passes control to a function block 725 and a function block 735.

The function block 720 computes the border gradient for a block in the reference frame, and passes control to a function block 740. The function block 725 computes the border gradient for a (co-located) block in the processed frame, and passes control to the function block 740.

The function block 730 computes the in-block gradient for the block in the reference frame, and passes control to a function block 745. The function block 735 computes the in-block gradient for the block in the processed frame, and passes control to the function block 745.

The function block 740 combines the border gradients, and passes control to a function block 750. The function block 745 combines the in-block gradients, and passes control to the function block 750.

The function block 750 computes the blockiness metric, and passes control to a function block 755. The function block 755 binarizes the blockiness metric, and passes control to a function block 760. The function block 760 outputs the blockiness metric, and passes control to an end block 799.

A description will now be given of some of the many attendant advantages/features of the present invention, some of which have been mentioned above. For example, one advantage/feature is an apparatus having a full-reference blocking artifact detector for detecting blocking artifacts in a processed version of a picture based on a blockiness metric. The blockiness metric is determined based on respective local variations in the processed version of the picture and in an original version of the picture.

Another advantage/feature is the apparatus having the full-reference blocking artifact detector as described above, wherein the respective local variations include a local variation across a block border in the processed version of the picture, a local variation across a co-located block border in the original version of the picture, a local variation within a block contiguous to the block border in the processed version of the picture, and a local variation within a co-located block contiguous to the block border in the original version of the picture.

Yet another advantage/feature is the apparatus having the full-reference blocking artifact detector wherein the respective local variations include a local variation across a block border in the processed version of the picture, a local variation across a co-located block border in the original version of the picture, a local variation within a block contiguous to the block border in the processed version of the picture, and a local variation within a co-located block contiguous to the block border in the original version of the picture, as described above, wherein the local variation across the block border, the local variation across the co-located block border, the local variation within the block, and the local variation within the co-located block relate to one or more gradients.

Still another advantage/feature is the apparatus having the full-reference blocking artifact detector as described above, wherein a quantity of blockiness is determined responsive to a difference between a gradient at a block border in the original version of the picture and a gradient at a co-located block border in the processed version of the picture, and a gradient within a block, contiguous to the block border, in the original version of the picture and a gradient within a co-located block, contiguous to the co-located block border, in the processed version of the picture.

Moreover, another advantage/feature is the apparatus having the full-reference blocking artifact detector wherein a quantity of blockiness is determined responsive to a difference between a gradient at a block border in the original version of the picture and a gradient at a co-located block border in the processed version of the picture, and a gradient within a block, contiguous to the block border, in the original version of the picture and a gradient within a co-located block, contiguous to the co-located block border, in the processed version of the picture, as described above, wherein a border blockiness is determined by comparing the difference between the gradient at the block border in the original version of the picture and the gradient at the co-located block border in the processed version of the picture.

Further, another advantage/feature is the apparatus having the full-reference blocking artifact detector as described above, wherein the blockiness metric is binarized by comparing a value of the blockiness metric to a threshold value.

Also, another advantage/feature is the apparatus having the full-reference blocking artifact detector as described above, wherein the blockiness metric is aggregated for all portions of the picture.

Additionally, another advantage/feature is the apparatus having the full-reference blocking artifact detector as described above, wherein the apparatus is comprised in a video encoder.

Moreover, another advantage/feature is the apparatus having the full-reference blocking artifact detector as described above, wherein the apparatus is implemented in a post processing environment relative to a video encoder.

Further, another advantage/feature is the apparatus having the full-reference blocking artifact detector as described above, further including a re-encoding decision device for determining whether to re-encode at least one of the original version of the picture and the processed version of the picture when blocking artifacts are detected.

Also, another advantage/feature is the apparatus having the full-reference blocking artifact detector further including the re-encoding decision device as described above, wherein the re-encoding decision device indicates that re-encoding is to be performed, when an amount of blockiness detected exceeds a threshold.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a full-reference blocking artifact detector for detecting blocking artifacts in a processed version of a picture based on a blockiness metric,
wherein the full-reference blocking artifact detector has at least a first input for receiving the processed version of the picture and a second input for receiving an original version of the picture, and the blockiness metric is determined based on respective local variations in the processed version of the picture and in the original version of the picture,
wherein a quantity of blockiness is determined responsive to:
a difference between a gradient at a block border in the original version of the picture and a gradient at a co-located block border in the processed version of the picture,
a gradient within a block, contiguous to the block border, in the original version of the picture, and
a gradient within a co-located block, contiguous to the co-located block border, in the processed version of the picture.

2. The apparatus of claim 1, wherein the respective local variations comprise a local variation across a block border in the processed version of the picture, a local variation across a co-located block border in the original version of the picture, a local variation within a block contiguous to the block border in the processed version of the picture, and a local variation within a co-located block contiguous to the block border in the original version of the picture.

3. The apparatus of claim 2, wherein the local variation across the block border, the local variation across the co-located block border, the local variation within the block, and the local variation within the co-located block relate to one or more gradients.

4. The apparatus of claim 1, wherein a border blockiness is determined by comparing the difference between the gradient at the block border in the original version of the picture and the gradient at the co-located block border in the processed version of the picture with a threshold.

5. The apparatus of claim 1, wherein the blockiness metric is binarized by comparing a value of the blockiness metric to a threshold value.

6. The apparatus of claim 1, wherein the blockiness metric is aggregated for all portions of the picture.

7. The apparatus of claim 1, wherein the apparatus is comprised in a video encoder.

8. The apparatus of claim 1, wherein the apparatus is implemented in a post processing environment relative to a video encoder.

9. The apparatus of claim 1, further comprising a re-encoding decision device for determining whether to re-encode at least one of the original version of the picture and the processed version of the picture when blocking artifacts are detected.

10. The apparatus of claim 9, wherein said re-encoding decision device indicates that re-encoding is to be performed, when an amount of blockiness detected exceeds a threshold.

11. A method, comprising:
detecting blocking artifacts in a processed version of a picture based on a blockiness metric,
wherein the blockiness metric is determined based on respective local variations in the processed version of the picture and in an original version of the picture,
wherein a quantity of blockiness is determined responsive to:
a difference between a gradient at a block border in the original version of the picture and a gradient at a co-located block border in the processed version of the picture,
a gradient within a block, contiguous to the block border, in the original version of the picture, and
a gradient within a co-located block, contiguous to the co-located block border, in the processed version of the picture.

12. The method of claim 11, wherein the respective local variations comprise a local variation across a block border in the processed version of the picture, a local variation across a co-located block border in the original version of the picture, a local variation within a block contiguous to the block border in the processed version of the picture, and a local variation within a co-located block contiguous to the block border in the original version of the picture.

13. The method of claim 12, wherein the local variation across the block border, the local variation across the co-located block border, the local variation within the block, and the local variation within the co-located block relate to one or more gradients.

14. The method of claim 11, wherein a border blockiness is determined by comparing the difference between the gradient at the block border in the original version of the picture and the gradient at the co-located block border in the processed version of the picture with a threshold.

15. The method of claim 11, wherein the blockiness metric is binarized by comparing a value of the blockiness metric to a threshold value.

16. The method of claim 11, wherein the blockiness metric is aggregated for all portions of the picture.

17. The method of claim 11, wherein the method is performed in a video encoder.

18. The method of claim 11, wherein the method is performed in a post processing environment relative to a video encoder.

19. The method of claim 11, further comprising determining whether to re-encode at least one of the original version of the picture and the processed version of the picture when blocking artifacts are detected.

20. The method of claim 19, further comprising providing an indication that re-encoding is to be performed, when an amount of blockiness detected exceeds a threshold.

* * * * *